(12) United States Patent
Burns et al.

(10) Patent No.: US 10,812,458 B2
(45) Date of Patent: Oct. 20, 2020

(54) SYSTEMS AND METHODS FOR TWO-FACTOR LOCATION-BASED DEVICE VERIFICATION

(71) Applicant: American Wagering, Inc., Las Vegas, NV (US)

(72) Inventors: James Burns, Las Vegas, NV (US); Junqiao Ai, Las Vegas, NV (US); Stephen Denham, Las Vegas, NV (US); Mike Schear, Las Vegas, NV (US); Adam Goldstein, Las Vegas, NV (US)

(73) Assignee: AMERICAN WAGERING, INC., Las Vegas, NV (US)

( * ) Notice: Subject to any disclaimer, the term of this patent is extended or adjusted under 35 U.S.C. 154(b) by 241 days.

(21) Appl. No.: 15/632,789

(22) Filed: Jun. 26, 2017

(65) Prior Publication Data
US 2018/0375845 A1    Dec. 27, 2018

(51) Int. Cl.
*H04L 29/06*      (2006.01)
*G06Q 50/34*     (2012.01)
*H04W 12/06*    (2009.01)
*H04W 4/02*      (2018.01)

(52) U.S. Cl.
CPC ............ *H04L 63/08* (2013.01); *G06Q 50/34* (2013.01); *H04L 63/0861* (2013.01); *H04L 63/107* (2013.01); *H04W 4/02* (2013.01); *H04W 12/06* (2013.01); *H04L 2463/082* (2013.01)

(58) Field of Classification Search
CPC ... H04L 63/08; H04L 63/0861; H04L 63/107; H04W 12/06; H04W 4/02; G06Q 50/34
See application file for complete search history.

(56) References Cited

U.S. PATENT DOCUMENTS

| 7,198,571 B2 | 4/2007 | LeMay et al. |
| 8,226,471 B2 | 7/2012 | Sylla |
| 8,267,792 B2 | 9/2012 | Buchholz et al. |
| 8,292,741 B2 * | 10/2012 | Burman ............ G06Q 20/3224 463/42 |
| 8,616,981 B1 * | 12/2013 | Guinn .................... G07F 17/34 463/16 |

(Continued)

OTHER PUBLICATIONS

H. Jonsson, P. Nugues, A. Tavella, I. Amaral, M. Tachibana and V. Santos, "Proximity-based reminders using Bluetooth," 2014 IEEE International Conference on Pervasive Computing and Communication Workshops (PERCOM Workshops), Budapest, 2014, pp. 151-153. (Year: 2014).*

(Continued)

*Primary Examiner* — Kari L Schmidt
(74) *Attorney, Agent, or Firm* — Armstrong Teasdale LLP

(57) ABSTRACT

A system for two-factor location-based device verification includes a processor and a non-transitory, tangible, computer-readable storage medium having instructions stored thereon that, in response to execution by the processor, cause the processor to perform operations including: (i) receiving, from a client device, a first location factor; (ii) receiving, from the client device, a second location factor; (iii) determining, based upon the first location factor and the second location factor, that the client device is within a predefined area; and (iv) creating, in response to the determining, a new wagering account in association with a user of the client device.

15 Claims, 4 Drawing Sheets

(56) References Cited

U.S. PATENT DOCUMENTS

| | | |
|---|---|---|
| 8,926,434 B2 | 1/2015 | Merati et al. |
| 9,053,604 B2 | 6/2015 | Sylla |
| 9,129,333 B2* | 9/2015 | Hardie .................... H04W 4/02 |
| 9,380,421 B1* | 6/2016 | Vltavsky ............... H04W 4/021 |
| 9,430,909 B2* | 8/2016 | Shore .................. G07F 17/3241 |
| 9,521,521 B2 | 12/2016 | Hillary et al. |
| 9,524,619 B2 | 12/2016 | Colvin et al. |
| 9,741,237 B1* | 8/2017 | Knas .................... G06Q 90/205 |
| 10,198,899 B2* | 2/2019 | Yang ................... G07F 17/3225 |
| 2001/0003099 A1* | 6/2001 | Von Kohorn .......... H04H 20/38 |
| | | 463/40 |
| 2002/0147049 A1* | 10/2002 | Carter, Sr. ............... G07F 17/32 |
| | | 463/42 |
| 2003/0236120 A1* | 12/2003 | Reece ..................... A63F 13/12 |
| | | 463/42 |
| 2004/0128157 A1* | 7/2004 | Aquilino ................ G06Q 30/02 |
| | | 463/25 |
| 2006/0035712 A1* | 2/2006 | Eastman ................. G07F 17/32 |
| | | 463/42 |
| 2006/0183462 A1* | 8/2006 | Kolehmainen .......... H04B 5/00 |
| | | 455/411 |
| 2007/0054739 A1* | 3/2007 | Amaitis .................. G06Q 50/10 |
| | | 463/42 |
| 2007/0197247 A1* | 8/2007 | Inselberg ............... G06Q 30/02 |
| | | 455/517 |
| 2008/0076505 A1* | 3/2008 | Nguyen .................. G07F 17/32 |
| | | 463/16 |
| 2008/0076572 A1* | 3/2008 | Nguyen ............. G07F 17/3269 |
| | | 463/42 |
| 2008/0096628 A1* | 4/2008 | Czyzewski ............. G07F 17/32 |
| | | 463/17 |
| 2008/0102956 A1* | 5/2008 | Burman ................ H04L 63/107 |
| | | 463/42 |
| 2008/0207335 A1 | 8/2008 | DiMichele |
| 2010/0017261 A1* | 1/2010 | Evans .................... G06Q 30/02 |
| | | 705/7.34 |
| 2010/0035679 A1* | 2/2010 | Oram ...................... G07F 17/32 |
| | | 463/25 |
| 2010/0069144 A1* | 3/2010 | Curtis .................... G07F 17/32 |
| | | 463/25 |
| 2010/0321499 A1* | 12/2010 | Ortiz ........................ H04N 7/18 |
| | | 348/157 |
| 2012/0046110 A1* | 2/2012 | Amaitis .............. G07F 17/3237 |
| | | 463/42 |
| 2012/0058813 A1* | 3/2012 | Amaitis .............. G07F 17/3269 |
| | | 463/25 |
| 2012/0159584 A1* | 6/2012 | Pizot .................... G06F 21/608 |
| | | 726/5 |
| 2013/0091452 A1* | 4/2013 | Sorden ................ E21B 41/0092 |
| | | 715/771 |
| 2014/0057706 A1* | 2/2014 | Merrill ................ G07F 17/3279 |
| | | 463/25 |
| 2014/0194192 A1* | 7/2014 | Pierce, II ................ H04W 4/21 |
| | | 463/25 |
| 2014/0236700 A1* | 8/2014 | Abhyanker ............ G06Q 30/02 |
| | | 705/14.35 |
| 2014/0254466 A1* | 9/2014 | Wurster ................ H04L 12/189 |
| | | 370/312 |
| 2015/0084584 A1* | 3/2015 | Monks .................. H02J 7/0027 |
| | | 320/108 |
| 2015/0245180 A1* | 8/2015 | Lin ........................ G01S 5/0252 |
| | | 455/456.3 |
| 2015/0289125 A1* | 10/2015 | Van Phan .............. H04W 76/14 |
| | | 455/434 |
| 2016/0007184 A1* | 1/2016 | Kulikov ................ G01S 5/0252 |
| | | 455/41.2 |
| 2016/0012426 A1* | 1/2016 | Chitilian ............ G06Q 20/3674 |
| | | 705/44 |
| 2016/0091549 A1* | 3/2016 | Snook .................. G01R 31/021 |
| | | 324/543 |
| 2016/0140804 A1* | 5/2016 | Morgan ............... G07F 17/3272 |
| | | 463/42 |
| 2016/0343194 A1* | 11/2016 | Allen .................. G07F 17/3288 |
| 2016/0381038 A1* | 12/2016 | Disraeli .................. G06F 21/31 |
| | | 726/7 |
| 2017/0061731 A1 | 3/2017 | Colvin et al. |
| 2018/0270605 A1* | 9/2018 | Wang ...................... H04L 51/04 |
| 2018/0374099 A1* | 12/2018 | Litsur .............. G06Q 20/40145 |

OTHER PUBLICATIONS

Cottin, Nathanaël, and Maxime Wack. "Dynamic registration and discovery of location-based services using spatial registries." Proceedings of the 3rd workshop on Agent-oriented software engineering challenges for ubiquitous and pervasive computing. 2009. pp. 33-38. (Year: 2009).*

Chow, Chi-Yin, Jie Bao, and Mohamed F. Mokbel. "Towards location-based social networking services." Proceedings of the 2nd ACM SIGSPATIAL International Workshop on Location Based Social Networks. 2010. pp. 31-38. (Year: 2010).*

\* cited by examiner

SYSTEMS AND METHODS FOR TWO-FACTOR LOCATION-BASED DEVICE VERIFICATION

BACKGROUND

The subject matter disclosed herein relates to systems and methods for device verification and, more particularly, to systems and methods for two-factor location-based device verification, in which a physical location of a device, such as a mobile communications device within a casino sports book, is verified based upon a first location factor and a second location factor.

Multi-factor authentication systems, such as two-factor authentication systems, have been developed to authenticate a user's identity, such as, for example, based upon at least two pieces of information. For example, a traditional two-factor authentication system may authenticate the user based upon a password provided to the system by the user and a second piece of information known only to the user, such as a one-time verification code, generated by the system and delivered to the user for the purpose of authenticating the user to the system at the time the user requests access. Such two-factor authentication processes have not, however, been implemented for verification purposes, such as, for example, for the purpose of verifying the location of a user or of a device of the user. Rather, as described herein, most conventional two-factor systems are merely configured for the purpose of authenticating the identity of a user.

In addition, in the casino gaming industry, the proliferation of mobile communication devices, such as smartphones, has led to the development of technologies and systems for the implementation of casino games that may be played on mobile communications devices. To implement a casino game on a mobile communications device, however, many gaming jurisdictions within the United States require some form of verification that the user of the mobile communications device is physically located on the casino property. To satisfy this requirement, some known systems include a mobile communications device that is temporarily issued to a user by the casino. The presence of the user (as well as the mobile communications device) on the casino property is thus ensured by the casino's control over, and ownership of, the mobile communications device.

Such conventional systems are deficient, however, in that many casino patrons would prefer to play casino games, or to place wagers, from their personal mobile communications devices (e.g., from their personal smartphones). Traditionally, such systems have been difficult to implement, particularly where it is necessary to ensure that the casino patron is physically located within a particular casino property. For example, the verification processes implemented by many conventional location-based verification systems can be circumvented by users, such as, for example, by spoofing a device location, such that the device appears to be located within a particular casino property irrespective of the actual device location.

In addition, at least some drawbacks associated with traditional location-based verification techniques are exacerbated under circumstances that require more precise location-based verification of a mobile communications device within a casino. For example, in order to permit a user to place wagers within a casino sports book from a mobile communications device, it may be necessary to verify that the user is within the casino itself and that the user is within the area of the sports book. Thus, under certain circumstances, a more precise verification of a user's location within a casino may be necessary.

Systems and methods for more reliably verifying the physical location of a mobile communications device are therefore desirable. More specifically, systems and methods for two-factor verification of a device location are desirable, particularly systems and methods capable of two-factor verification of a physical location of a mobile communications device within a predetermined location, such as a predetermined location configured within software and pushed out to a mobile application executing on the mobile communications device. In some instances, such a predetermined location may include a sports book of a casino.

BRIEF DESCRIPTION

In one aspect, a system for two-factor location-based device verification is provided. The system includes a processor and a non-transitory, tangible, computer-readable storage medium having instructions stored thereon that, in response to execution by the processor, cause the processor to perform operations including: (i) receiving, from a client device, a first location factor; (ii) receiving, from the client device, a second location factor; (iii) determining, based upon the first location factor and the second location factor, that the client device is within a predefined area; and (iv) creating, in response to the determining, a new wagering account in association with a user of the client device.

In another aspect, a system for two-factor location-based device verification is provided. The system includes a processor and a non-transitory, tangible, computer-readable storage medium having instructions stored thereon that, in response to execution by the processor, cause the processor to perform operations including: (i) receiving, from a client device of a user, a request to register for a new wagering account; (ii) receiving, in conjunction with the request, a first location factor associated with the client device; (iii) identifying at least one sports book within a predefined distance of the client device; (iv) providing a message to the client device indicating a location of the sports book; (v) receiving, from the client device, a second location factor, wherein the second location factor is broadcast by a wireless beacon within the sports book, and wherein the client device receives the second location factor from the wireless beacon; (vi) determining, based upon the first location factor and the second location factor, that the client device is within an area associated with the sports book; and (vii) creating, in response to the determining, a new wagering account in association with the user of the client device.

In yet another aspect, a method for two-factor location-based device verification is provided. The method includes: (i) receiving, by a processor and from a client device, a first location factor; (ii) receiving, by the processor from the client device, a second location factor; (iii) determining, by the processor and based upon the first location factor and the second location factor, that the client device is within a predefined area; and (iv) creating, by the processor and in response to the determining, a new wagering account in association with a user of the client device.

DRAWINGS

These and other features, aspects, and advantages of the present disclosure will become better understood when the following detailed description is read with reference to the accompanying drawings in which like characters represent like parts throughout the drawings, wherein.

Figure 1:
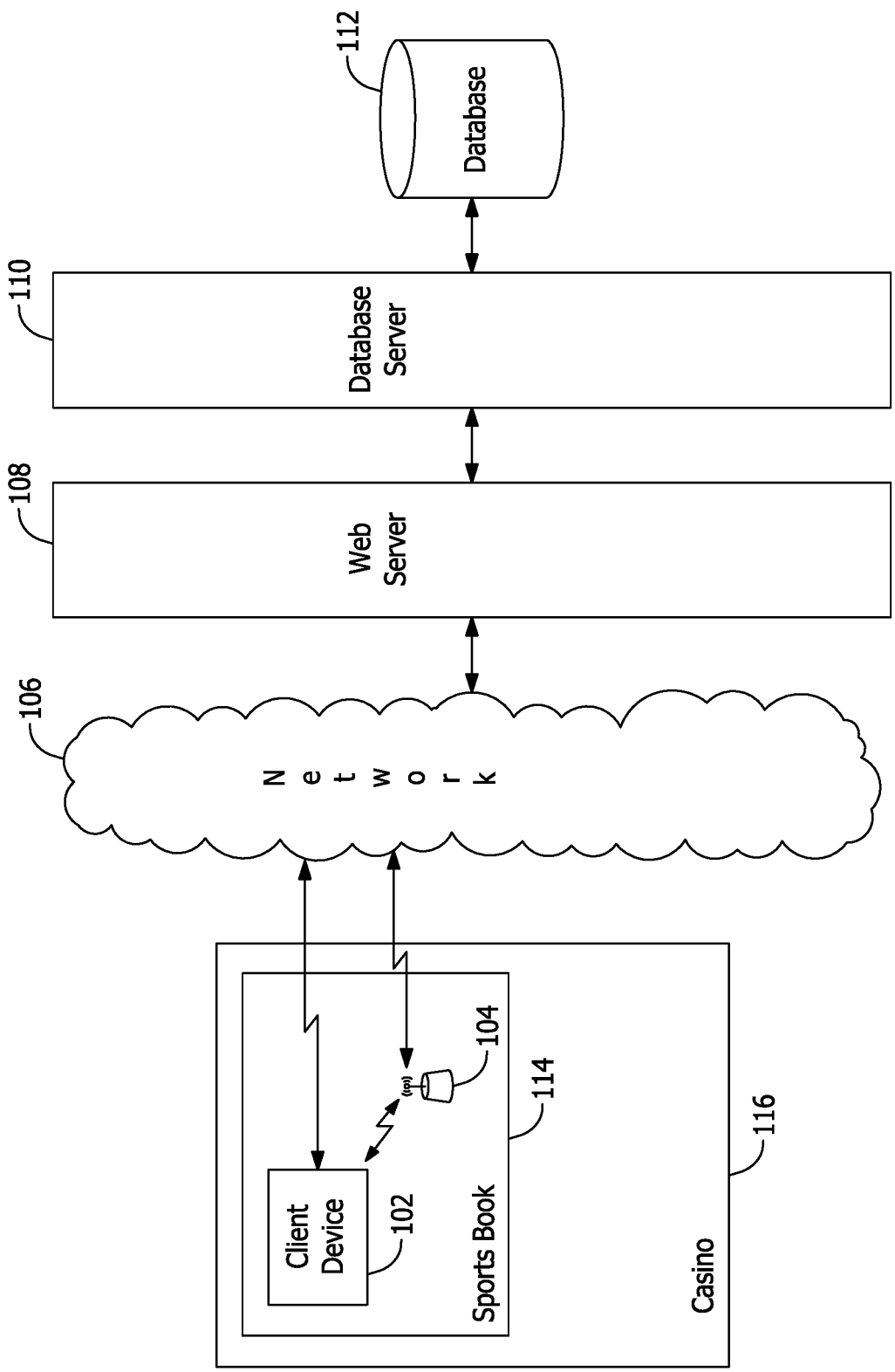
FIG. 1 is a schematic view of an exemplary two-factor location-based device verification system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device," "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with a user interface such as a mouse and a keyboard. Alternatively, other computer peripherals may also be used that may include, for example, but not be limited to, a scanner. Furthermore, in the exemplary embodiment, additional output channels may include, but not be limited to, a user interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, a "location factor" may include any data that may be used to determine a physical location of a client device. For example, a location factor may include global positioning system (GPS) data and/or data broadcast by and/or received for a wireless beacon, such as an identifier (e.g., a universally unique identifier or QUID) broadcast by and/or received from a wireless beacon.

In addition, as used herein, a "first location factor" may, in some cases, refer to GPS data, and a "second location factor" may, in some cases, refer to data broadcast by and/or received from a wireless beacon. However, the ordinals, "first," "second," "third," and so on should not be construed as limiting. Rather, where they occur, such ordinals are used merely for the purpose of distinguishing one location factor from another location factor.

Embodiments of the present disclosure relate to a two-factor location-based device verification system. The system facilitates two-factor verification of a physical location of a client device, such as a mobile communications device, within a predetermined location, such as a casino sports book. The system may ensure that the client device is physically located within the sports book based upon a first verification factor, such as at least one GPS coordinate, and a second verification factor, such as a unique identifier broadcast by and received from a wireless beacon disposed within the casino sports book. The system may further register a user to a new wagering account based upon a comparison of a self-photograph of a user of the client device taken from the client device to a driver's license photograph. In some embodiments, the system may permit the user to initiate a registration process from a location that is outside of a sports book, but may require that the user enter the sports book to complete the registration process. In various embodiments, once a user has successfully registered for a wagering account, the user may be permitted by the system to place wagers on sporting events from within and/or from without the sports book.

FIG. 1 is a perspective view of an exemplary two-factor location-based verification system 100. In the exemplary embodiment, system 100 includes a client device 102, a wireless beacon 104, a computer network 106, a web server 108, a database server 110, and/or a database 112. As described below, client device 102 may be a mobile communications device, such as a smartphone or a tablet. Accordingly, client device 102 may be transported by a user from location to location. However, as shown, and as described herein, during operation, client device 102 may be physically located within or physically transported to an area of a sports book 114 within a casino 116.

Accordingly, in the exemplary, client device 102 may be any personal computing device and/or any mobile communications device of a user, such as a personal computer, a tablet computer, a smartphone, and the like. Client device 102 may be configured to present an application (e.g., a smartphone "app") or a webpage, such as webpage or an app for authenticating a user to system 100 and/or an a webpage or app for registering for account access. To this end, client device 102 may include or execute software for viewing and interacting with a webpage and/or an app.

Wireless beacon 104 may be located within casino 116 and/or within sports book 114 and may be any suitable electronic device capable of wirelessly transmitting and/or receiving data via one or more communications protocols. In the exemplary embodiment, wireless beacon 104 is located within sports book 114. For example, in some embodiments, wireless beacon 104 may be configured to transmit and/or receive a low energy BLUETOOTH signal and/or a WiFi signal. More particularly, in some embodiments, wireless beacon 104 is an APPLE iBEACON or a GOOGLE EDDYSTONE beacon. Wireless beacon 104 may, in addition, be configured to transmit a location factor, such as universally unique identifier (or UUID), which may include, in some embodiments, a rotating combination of hexadecimal digits. The location factor may uniquely identify wireless beacon 104, and to transmit the location factor, wireless beacon 104 may communicate with a backend server, such as web server 108, which may provide the location factor (e.g., a rotating UUID) to wireless beacon 104 for broadcast. The location factor broadcast by wireless beacon 104 may be received by client device 102 and used, as described herein, for the purpose of verifying that client device 102 is physically located within sports book 114.

Network 106 may be any electronic communications system, such as any computer network or collection of computer networks, and may incorporate various hardware and/or software. Communication over network 106 may be accomplished via any suitable communication channels, such as, for example, one or more telephone networks, one or more extranets, one or more intranets, the Internet, one or more point of interaction devices (e.g., point of sale devices, smart phones, cellular phones), one or more electronic gaming machines, such as one or more electronic gaming machines located within casino 116, various online and/or offline communications systems, such as various local area and wide area networks, and the like.

Web server 108 may be any computer or computer system that is configured to receive and process requests made via HTTP. Web server 108 may be coupled between client device 102 and database server 110. More particularly, web server 108 may be communicatively coupled to client device 102 via network 106. In various embodiments, web server 108 may be directly coupled to database server 110 and/or communicatively coupled to database server 110 via a network, such as network 106. In some embodiments, communications between web server 108 and client device 102 may be implemented by way of a secure encrypted connection and/or communications protocol, such as an HTTPS connection and/or any other secure encrypted connection and/or communications protocol. Web server 108 may, in addition, function to store, process, and/or deliver one or more web pages and/or any other suitable content to client device 102. Web server 108 may, in addition, receive data, such as data provided to the app and/or webpage (as described herein) from client device 102 for subsequent transmission to database server 110.

In various embodiments, web server 108 may implement various hardware and/or software, such as, for example, one or more communication protocols, one or more message brokers, one or more data processing engines, one or more servlets, one or more application servers, and the like. For instance, in various embodiments, web server 108 may implement a message broker program module configured to translate a message or communications from a messaging protocol of a sending device to a messaging protocol of a receiving device (e.g., RABBITTMQ, KAFKA, ACTIVEMQ, KESTREL). Further still, in some embodiments, web server 108 may implement a data processing engine, such as a cluster computing framework like APACHE SPARK. In addition, in various embodiments, web server 108 may implement servlet and/or JSP server, such as APACHE TOMCAT. In some embodiments, web server 108 may function to process data received from client device 102, such as authentication and/or location verification data, which may include, for example, a first location factor (e.g., GPS data) and/or a second location factor (e.g., wireless beacon data).

Database server 110 may be any computer or computer program that provides database services to one or more other computers or computer programs. In various embodiments, database server 110 may be communicatively coupled between web server 108 and database 112. Database server 110 may, in addition, function to process data received from web server 108, such as authentication and/or location verification data, which may include, for example, a first location factor (e.g., GPS data) and/or a second location factor (e.g., wireless beacon data).

Database 112 may be any organized collection of data, such as, for example, any data organized as part of a relational data structure, any data organized as part of a flat file, and the like. Database 112 may be communicatively coupled to database server 110 and may receive data from, and provide data to, database server 110, such as in response to one or more requests for data, which may be provided via a database management system (DBMS) implemented on database server 110. In various embodiments, database 112 may be a non-relational database, such as an APACHE HADOOP database.

Although components of system 100 are described below and depicted at FIG. 1 as being interconnected in a particular configuration, it is contemplated that the systems, subsystems, hardware and software components, various network components, and database systems described herein may be variously configured and interconnected and may communicate with one another within system 100 to facilitate the processes and advantages described herein. For example, although a single wireless beacon 104, a single web server 108, a single database server 110, and a single database 112 are described above, it will be appreciated that system 100 may include any suitable number of interconnected, communicatively coupled, wireless beacons, web servers, database servers, and/or databases. Further, although certain functions, processes, and operations are described herein with respect to one or more system components, it is contemplated that one or more other system components may perform the functions, processes, and operations described herein.

Figure 2:
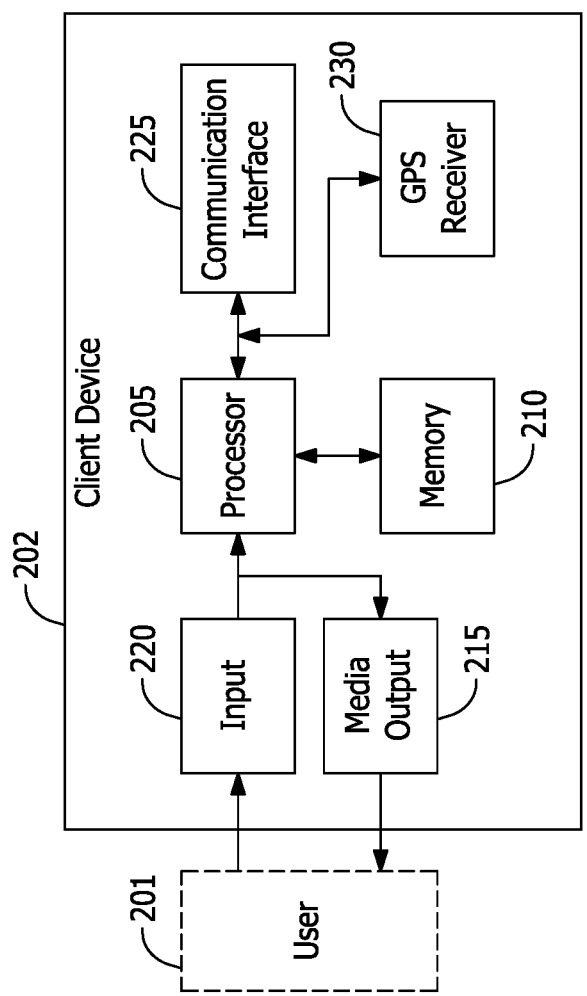
FIG. 2 is a schematic view of an exemplary client device, such as the client device shown in FIG. 1.

FIG. 2 is a schematic view of an exemplary client device 202, such as, for example, client device 102 (shown in FIG. 1). Accordingly, in various embodiments, client device 202 may be operated by a user 201. Client device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or transaction data to be stored and retrieved. Memory area 210 may include one or more computer readable media.

Client device 202 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 201. A graphical user interface may include, for example, an online store interface for viewing and/or purchasing items, and/or a wallet application for managing payment information. In some embodiments, client device 202 may include an input device 220 for receiving input from user 201. User 201 may use input device 220 to, without limitation, select and/or enter data, such as, for example, one or more report criteria or report filters.

Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

Client device 202 may also include a communication interface 225, communicatively coupled via network 106 to web server 108 and/or database server 110 (shown in FIG. 1). Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website.

In some embodiments, client device 202 may include a global positioning system (GPS) receiver 230 communicatively coupled to processor 205. GPS receiver 230 may include any suitable GPS receiver that may be implemented within client device 202 and that may be configured to receive GPS data, such as one or more GPS coordinates, from one or more GPS satellites. In some embodiments, GPS receiver 230 may also communicate with one or more cellular system towers to triangulate or otherwise obtain a physical location of client device 202.

Figure 3:
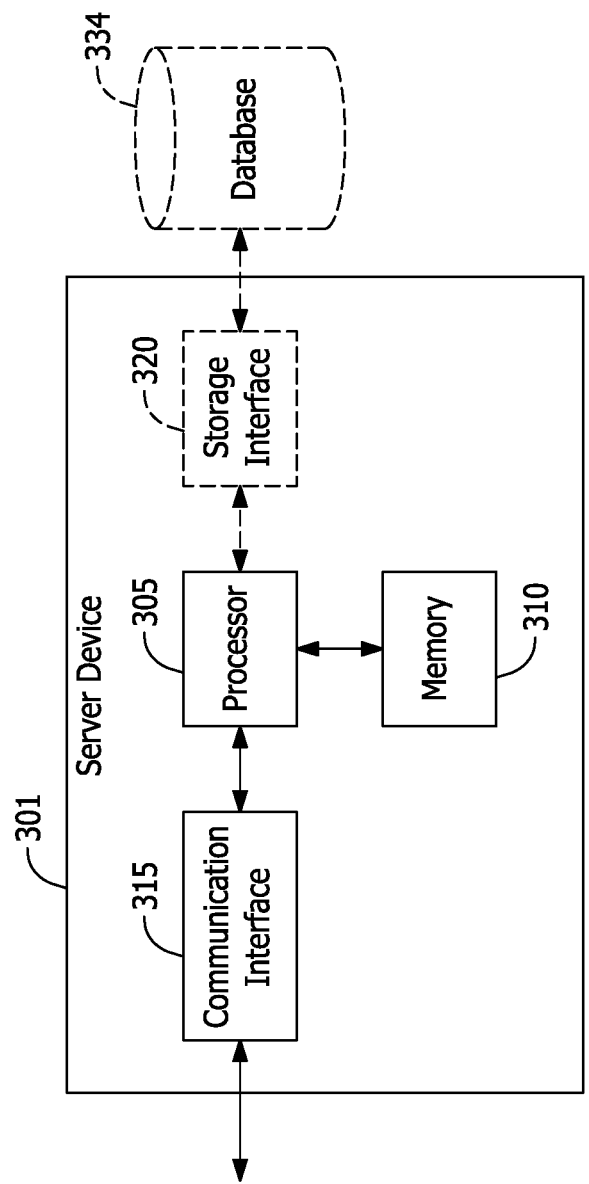
FIG. 3 is a schematic view of an exemplary server, such as one of the servers shown in FIG. 1.

FIG. 3 is a schematic view of an exemplary server computer device 301, such as, for example, either of web server 108 and/or database server 110 (shown in FIG. 1). Accordingly, server computer device 301 may include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 301 is capable of communicating with a remote computing device, as described above. For example, communication interface 315 may receive requests from client device 202 via the Internet and/or over a computer network.

Processor 305 may also be operatively coupled to a storage device 334 (e.g., database 112). Storage device 334 may be any computer-operated hardware suitable for storing and/or retrieving data, such as, but not limited to, data associated with database 320. In some embodiments, storage device 334 may be integrated in server computer device 301. For example, server computer device 301 may include one or more hard disk drives as storage device 334.

In other embodiments, storage device 334 may be external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Figure 4:
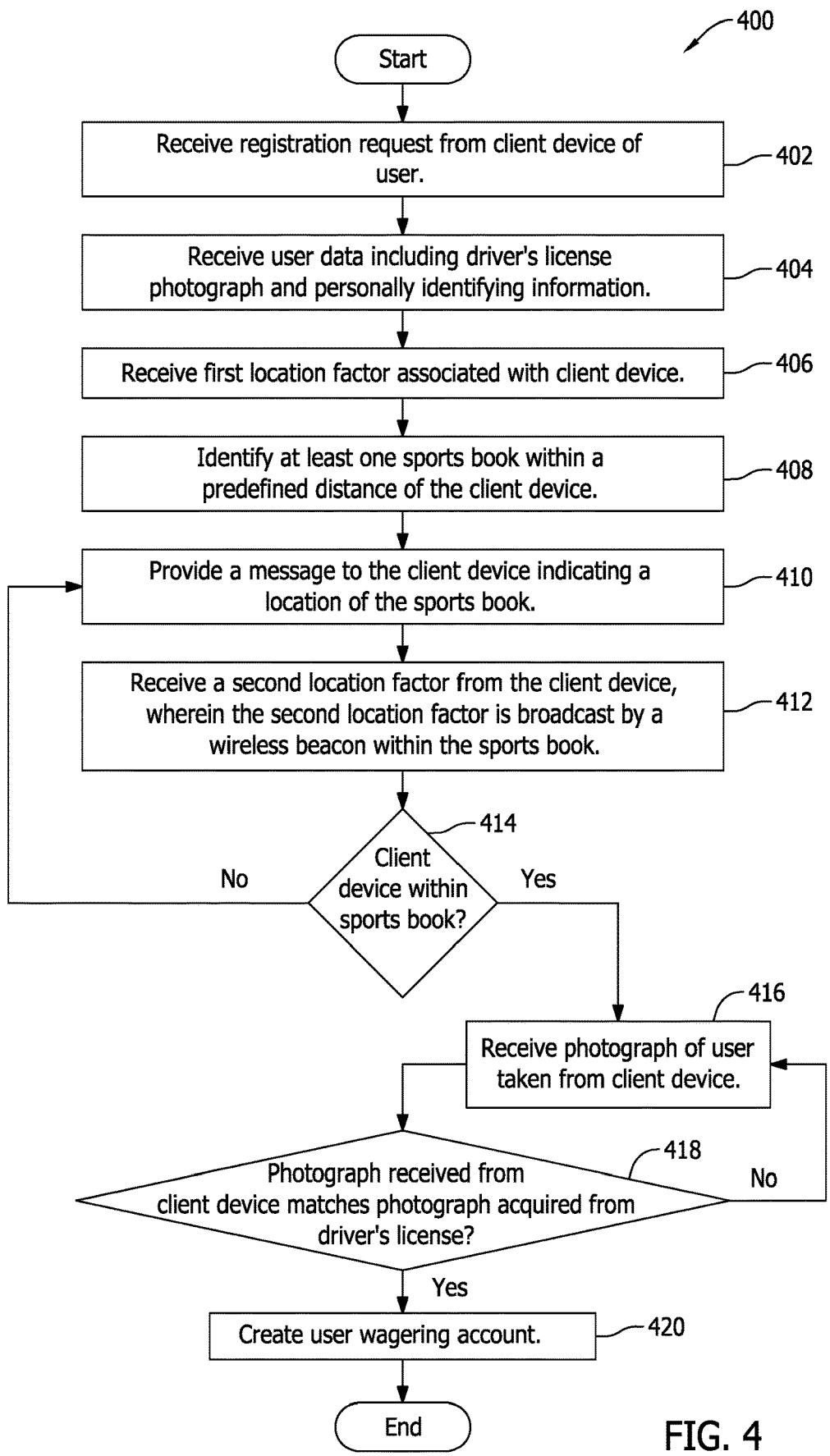
FIG. 4 is a flowchart illustrating an exemplary process for two-factor location-based device verification.

FIG. 4 is a flowchart illustrating an exemplary process 400 for two-factor location-based device verification. Accordingly, in the exemplary embodiment, web server 108 may receive a registration request from client device 102, such as, for example, in the case that a user of client device 102 wishes to place a wager on an outcome of a sporting event within sports book 114 (step 402).

In some embodiments, web server 108 may provide a link to a registration webpage, which the user may interact with to register for a new wagering account. The user may also be prompted to use client device 102 to scan or photograph the user's driver's license, such that client device 102 acquires an image of the user's driver's license photograph (step 404). The user may also, in some embodiments, be prompted to enter a variety of other personally identifying information, such as, for example, a social security number, a telephone number associated with client device 102, an email address, and/or a password associated with a new wagering account (step 404). However, as described below, this data may be collected during any phase of process 400. In various embodiments, a user may initiate such a registration process from any physical location, such as, for example, from a location that is outside of sports book 114. However, as described herein, to complete the registration process, in the exemplary embodiment, the user may be required to enter or physically travel to the physical location of sports book 114. Thus, the user may, in some embodiments, provide an image of the user's driver's license photograph and/or other personally identifying information from a location that is outside of sports book 114.

In addition, in some embodiments, irrespective of whether web server 108 has received the data described above, web server 108 may receive a first location factor, such as at least one GPS coordinate, associated with client device 102 (step 406). In response, web server 108 may identify at least one predefined physical location, such as sports book 114, within a predefined distance of client device 102 (step 408). As described herein, the predefined physical location may be any suitable predefined physical location, which may be configured and/or stored within software executing on client device 102 and/or pushed a mobile application executing on client device 102. Thus, although process 400 is described with reference to sports book 114, in various embodiments, any suitable predefined physical location may be selected or utilized during an account registration process. Further, in one embodiment, web server 108 may prompt the user for the driver's license scan and/or other personally identifying information prior to identification of sports book 114.

Having identified at least one sports book 114 within a predefined range or physical distance of client device 102, web server 108 may provide a message to client device 102 indicating the physical location (e.g., the street address and/or a map including a pin drop) of sports book 114 (step 410). The user may receive and/or view the location of sports book 114 and, in response, travel to sports book 114.

Web server 108 may, in various embodiments, standby as the user travels to sports book 114. Once the user has arrived at the physical location of sports book 114, however, web server 108 may receive a second location factor (such as a unique identifier received from wireless beacon 104) from client device 102 (step 412). As described above, the second location factor may be broadcast by wireless beacon 104 (or a plurality of wireless beacons) within sports book 114. In some embodiments, client device 102 may "pair" with wireless beacon 104. However, in other embodiments, client device 102 may simply receive the second location factor (or a plurality of rotating second location factors, as described herein) from wireless beacon 104.

In response to receipt of the second location factor, web server 108 and/or, in some cases, database server 110, may analyze both of the first location factor and second location factor to verify that client device 102 is in fact physically located within sports book 114 (step 414). For example, web server 108 may verify that client device 102 is physically located within sports book 114 based upon the combination of verification factors of the GPS signal (e.g., the first verification factor) received from client device 102 within sports book 114 and the unique identifier broadcast by wireless beacon 104 (e.g., the second verification factor) received from client device 102.

More particularly, web server 108 may compare the received GPS coordinates to the GPS coordinates associated with sports book 114 (which may be stored by system 100) to verify the location of client device 102 within sports book 114. Similarly, to complete the two-factor location-based verification process, web server 108 may compare the unique identifier received from client device 102 to the unique identifier generated by web server 108 and provided (as described above) to wireless beacon 104. If the GPS coordinates received from client device 102 match the GPS coordinates associated with sports book 114 (and/or casino 116, in the case that the GPS coordinates are not insufficiently specific to identify sports book 114) and the unique identifier received from client device 102 matches the unique identifier generated and stored by web server 108 (and/or database server 110), web server 108 and/or database server 110 may reliably verify that client device 102 is in fact physically located within sports book 114.

If, on the other hand, one or both of the GPS coordinates and/or the unique identifier do not match their respective counterparts, web server 108 may determine that client device 102 is not located within sports book 114, in which case web server 108 may provide a message to client device 102 instructing the user to travel to the location of sports book 114 and/or a message, as described above, indicating the physical location of sports book 114 (step 410). In some embodiments, if the user does not travel to the location of sports book 114 within a predetermined period of time, web server 108 may time the registration request out and process 400 may terminate.

However, in the case that web server 108 is able to verify the physical location of client device 102 within sports book 114, web server 108 may prompt the user to use client device 102 to take a self-photograph of the user, such as a photograph of the user's face (e.g., a "selfie") for the purpose of authenticating the user's identity. The user may, in response, use client device 102 to acquire the self-photograph, and client device 102 may transmit the self-photograph to web server 108. In response to receiving the self-photograph, web server 108 (and in some cases another backend system, such as database server 110) may determine whether the self-photograph matches a photograph of the user included in the photograph of the user's driver's license (described above) (steps 416 and 418).

In addition, in some embodiments, web server 108 may re-verify the location of client device 102, as described above, in response to receive the self-photograph. For example, in some embodiments, web server 108 may request and/or receive a second or follow up first verification factor and a second or follow up second verification factor, such as a second set of GPS coordinates and/or a second unique identifier received from wireless beacon 104. Web server 108 may thus re-verify, prior to registering the user for a new wagering account, that the user has not departed sports book 114.

Web server (or another backend system) may implement a facial recognition algorithm and/or a computer vision algorithm to determine whether the photograph in the user's driver's license matches the self-photograph taken by the user from client device 102. In some embodiments, the driver's license photograph and the self-photograph may be transmitted to a backend display, such as a display located within casino 116 or sports book 114 back office or cage, where a human operator may view both photographs for analysis and comparison. Thus, in some embodiments, the user's identity may be authenticated or verified by a computer system, such as web server 108, while in other embodiments, a human operator may perform the authentication. Further, in some embodiments, the authentication of the user may be performed by both of a computer system and a human operator, such as, for example, for the purpose of redundancy or added security.

Irrespective of the method by which the user's identity is authenticated, if the self-photograph matches the photograph displayed on the driver's license, web server 108 and/or database server 110 may generate or create a new wagering account for the user, whereupon the user may login to the wagering account to begin placing wagers on sporting events (step 420). For instance, once the user is logged in to a newly created/existing wagering account, and the location of client device 102 is verified as being within a particular gaming jurisdiction (e.g., within a particular state within the United States), web server 108 may grant the user access to the newly created/existing wagering account, whereupon the user may proceed to place one or more wagers on one or more sporting events in conjunction with sports book 114. For example, client device 102 may communicate with web server 108 to place wagers and receive wager outcomes in association with various sporting events. In addition, one or more awards, such as one or more monetary awards or credits associated with one or more monetary awards, may be provided to the user via client device 102 (e.g., in the instance that the user places a wager on a sporting event that is associated with a winning outcome).

Embodiments of the two-factor location-based device verification system therefore enable, as described above, two-factor verification of a physical location of a client device, such as a mobile communications device, within a predefined physical location, such as, for example, a casino sports book. The system may further permit a user to register for a new wagering account. To this end, the system may ensure that the client device is physically located within the sports book during at least part of the account registration process. For example, in some embodiments, the system may permit the user to initiate a registration process from any physical location, such as any physical location that is within and/or without a sports book. However, in at least some embodiments, the system may require that the user physically enter a location of a sports book to complete a new account registration process. The physical location of the user within the sports book may be verified based upon a first verification factor, such as at least one GPS coordinate, and a second verification factor, such as a unique identifier broadcast by and received from a wireless beacon disposed within the casino sports book. The system may further register a user to a new wagering account based upon a comparison of a self-photograph of a user of the client device taken from the client device to a driver's license photograph.

Exemplary technical effects of the two-factor location-based device verification system described herein include, for example: (a) determination of a client device location based upon a first verification factor; (b) indication of a predefined location, such as a casino sports book, within a predefined distance of the client device; (c) verification of the device location based upon the first verification factor; (d) determination of the client device location based upon a second verification factor broadcast by a wireless beacon disposed within the sports book; (e) verification of the device location based upon the second verification factor; and (f) creation of a new wagering account based upon the two-factor location-based verification and authentication of an identity of a user of the client device based upon a comparison of a self-photograph taken from the client device to a driver's license photograph.

Exemplary embodiments of a two-factor location-based device verification system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where device location verification is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for two-factor location-based device verification, the system comprising:
   a processor; and
   a non-transitory, tangible, computer-readable storage medium having instructions stored thereon that, in response to execution by the processor, cause the processor to perform operations comprising:
      receiving, from a client device of a user, a request to register for a new wagering account;
      receiving through a first communication channel, in conjunction with the request, a first location factor associated with the client device determined from current information received from a single first source device located outside a predefined area;
      identifying at least one sports book within a predefined distance of the client device;
      providing a message to the client device indicating a location of the sports book;
      receiving, from the same client device of the user, through a second communication channel separate and different from the first communication channel, a second location factor determined from current information received from a single wireless beacon located within the sports book, wherein the second location factor is broadcast by the single wireless beacon, the first source device being a different type of device than the single wireless beacon, and wherein the client device receives the second location factor from the single wireless beacon, whereby the first location factor and the second location factor enable independent two-factor verification of client device location;
      determining, based upon a geographical location of the first location factor and a proximity of the first location factor to the second location factor, that the client device is within the location of the sports book; and
      creating, in response to the determining, a new wagering account associated with the user of the client device.

2. The system of claim 1, wherein the first location factor includes at least one global positioning system (GPS) coordinate, and wherein the second location factor includes a unique identifier associated with the wireless beacon.

3. The system of claim 1, wherein the determining that the client device is within the area associated with the sports book further comprises:

analyzing the first location factor to determine that the client device is within the area associated with the sports book; and analyzing the second location factor to determine that the client device is within the area associated with the sports book.

4. The system of claim 1, wherein the instructions further cause the processor to perform operations comprising:
generating a second identification factor;
storing the second identification factor;
providing the second identification factor to the wireless beacon, wherein the wireless beacon is configured to broadcast the second identification factor to the client device; and
comparing the second location factor received from the client device to the stored second identification factor to determine whether the client device is within the area associated with the sports book.

5. The system of claim 1, wherein the instructions further cause the processor to perform operations comprising:
determining, based upon the first location factor and the second location factor, that the client device is not within the area associated with the sports book; and
providing a message to the client device indicating a location of the sports book and instructing the user of the client device to travel to the location of the sports book.

6. The system of claim 1, wherein the creating the new wagering account further comprises:
receiving, from the client device, a photograph of the user's face captured from a camera of the client device;
receiving, from the client device, a photograph of a driver's license of the user captured from the camera of the client device, the photograph of the driver's license including a driver's license photograph;
comparing the photograph of the user's face captured from the camera to the driver's license photograph; and
authenticating an identity of the user based upon the comparing.

7. The system of claim 1, wherein the instructions further cause the processor to perform operations comprising:
receiving, from the client device, at least one wager;
determining an outcome based upon the at least one wager; and
providing, based upon the determining, an award to the user based upon the outcome.

8. The system of claim 7, wherein the at least one wager is received in association with a sporting event and the outcome is an outcome of the sporting event.

9. A method for two-factor location-based device verification comprising:
receiving, from a client device of a user, a request to register for a new wagering account:
receiving, through a first communication channel, in conjunction with the request, a first location factor associated with the client device determined from current information received from a single first source device located outside a predefined area;
identifying at least one sports book within a predefined distance of the client device;
providing a message to the client device indicating a location of the sports book;
receiving, by the processor from the same client device of the user, through a second communication channel separate and different from the first communication channel, a second location factor determined from current information received from a single wireless beacon within the sports book wherein the second location factor is broadcast by the single wireless beacon, the first source device being a different type of device than the single wireless beacon, and wherein the client device receives the second location factor from the single wireless beacon, whereby the first location factor and the second location factor enable independent two-factor verification of client device location;
determining, by the processor and based upon a geographical location and a proximity of the first location factor to the second location factor, that the client device is within the sports book; and
creating, by the processor and in response to the determining, a new wagering account associated with a user of the client device.

10. The method of claim 9, further comprising:
generating, by the processor, a second identification factor;
storing, by the processor, the second identification factor;
providing, by the processor, the second identification factor to a wireless beacon, wherein the wireless beacon is configured to broadcast the second identification factor to the client device; and
comparing, by the processor, the second location factor received from the client device to the stored second identification factor to determine whether the client device is within the predefined area.

11. The method of claim 9, further comprising:
determining, by the processor and based upon the first location factor and the second location factor, that the client device is not within the predefined area; and
providing, by the processor, a message to the client device indicating a location of the predefined area and instructing the user of the client device to travel to the location of the predefined area.

12. A non-transitory computer-readable storage medium having computer-executable instructions embodied thereon, wherein when executed by a two-factor location-based verification computing device that includes at least one processor in communication with a memory, the computer-executable instructions cause the two-factor location-based verification computing device to:
receiving, from a client device of a user, a request to register for a new wagering account:
receive, from the client device, through a first communication channel, in conjunction with the request, a first location factor associated with the client device determined from current information received from a single first source device located outside a sports book, the first source device comprising a (1) first wireless beacon and a second wireless beacon, or (2) a first source device of a different type than the wireless beacon;
identify at least one sports book within a predefined distance of the client device;
provide a message to the client device indicating a location of the sports book;
receive, from the same client device of the user, through a second communication channel separate and different from the first communication channel, a second location factor determined from current information received from a single wireless beacon located within the sports book, wherein the second location factor is broadcast by the single wireless beacon, the first source device being a different type of device than the single wireless beacon, and the client device receives the second location factor from the single wireless beacon, whereby the first location factor and the second location factor enable independent two-factor verification of client device location;

determine, based upon a geographical location of the first location factor and a proximity of the first location factor to the second location factor, that the client device is within the sports book; and create, in response to the determining, a new wagering account associated with a user of the client device.

13. The non-transitory computer-readable storage medium of claim 12, wherein the computer-executable instructions further cause the two-factor location-based verification computing device to: receive the first location factor and the second location factor, wherein the first location factor includes at least one global positioning system (GPS) coordinate, and wherein the second location factor includes a unique identifier associated with a wireless beacon.

14. The non-transitory computer-readable storage medium of claim 13, wherein the computer-executable instructions further cause the two-factor location-based verification computing device to: receive the first location factor and the second location factor, wherein the first location factor includes at least one identifier of a wireless beacon positioned outside the sports book, and wherein the second location factor includes a unique identifier associated with a wireless beacon.

15. The non-transitory computer-readable storage medium of claim 14, wherein the processor is further configured to receive the unique identifier associated with the wireless beacon, wherein the unique identifier associated with the wireless beacon is a randomly generated combination of hexadecimal digits.

* * * * *